United States Patent
Chan et al.

(10) Patent No.: US 9,996,141 B2
(45) Date of Patent: Jun. 12, 2018

(54) STORAGE DEVICE AND ELECTRONIC DEVICE USING THE SAME

(71) Applicant: HONGFUJIN PRECISION ELECTRONICS(TIANJIN)CO., LTD., Tianjin (CN)

(72) Inventors: Ching-Hsiang Chan, New Taipei (TW); Jiing-Shyang Jang, New Taipei (TW); Meng-Liang Yang, Shenzhen (CN)

(73) Assignee: HONGFUJIN PRECISION ELECTRONICS (TIANJIN) CO., LTD, Tianjin (CN)

( * ) Notice: Subject to any disclaimer, the term of this patent is extended or adjusted under 35 U.S.C. 154(b) by 315 days.

(21) Appl. No.: 14/806,168

(22) Filed: Jul. 22, 2015

(65) Prior Publication Data
US 2016/0334855 A1    Nov. 17, 2016

(30) Foreign Application Priority Data

May 11, 2015   (CN) .......................... 2015 1 0235300

(51) Int. Cl.
*G06F 1/32* (2006.01)
*G11B 33/10* (2006.01)
*G11B 33/12* (2006.01)

(52) U.S. Cl.
CPC .......... *G06F 1/3287* (2013.01); *G06F 1/3268* (2013.01); *G11B 33/10* (2013.01); *G11B 33/128* (2013.01)

(58) Field of Classification Search
CPC ...................................... G06F 1/3287
See application file for complete search history.

(56) References Cited

U.S. PATENT DOCUMENTS 9,720,479 B2 * 8/2017 Kunnathur Ragupathi ............. G06F 1/3203
2011/0296162 A1 * 12/2011 Pakenham ............ G06F 1/3203
713/100

* cited by examiner

*Primary Examiner* — Kim Huynh
*Assistant Examiner* — Eric Chang
(74) *Attorney, Agent, or Firm* — ScienBiziP, P.C.

(57) ABSTRACT

The disclosure storage device provides a hard disk drive (HDD) module, the HDD module includes a plurality of HDD units, and each the HDD unit include a plurality of HDDs, a switching unit, and a plurality of indication units. The switching unit configured for operating in a first state or a second state. Each indication unit is configured to electrically couple to the switching unit. When the switching unit outputs a first state signal, the switch control circuit outputs a first control signal to turn off the corresponding indicating control circuits. When the switch control circuit operates in the second state, the switch control circuit outputs a second control signal to turn on the corresponding indicating control circuits. An electronic device using the same is also provided.

6 Claims, 4 Drawing Sheets

STORAGE DEVICE AND ELECTRONIC DEVICE USING THE SAME

FIELD

The subject matter herein generally relates to electronic devices, and particularly to an electronic device including a storage device.

BACKGROUND

Just a bunch of disks (JBOD) usually comprises a plurality of hard disk drives (HDDs), which are coupled to a plurality of light emitting diodes (LEDs) to display working states of the JBOD.

BRIEF DESCRIPTION OF THE DRAWINGS

Implementations of the present technology will now be described, by way of example only, with reference to the attached figures.

DETAILED DESCRIPTION

Figure 1:
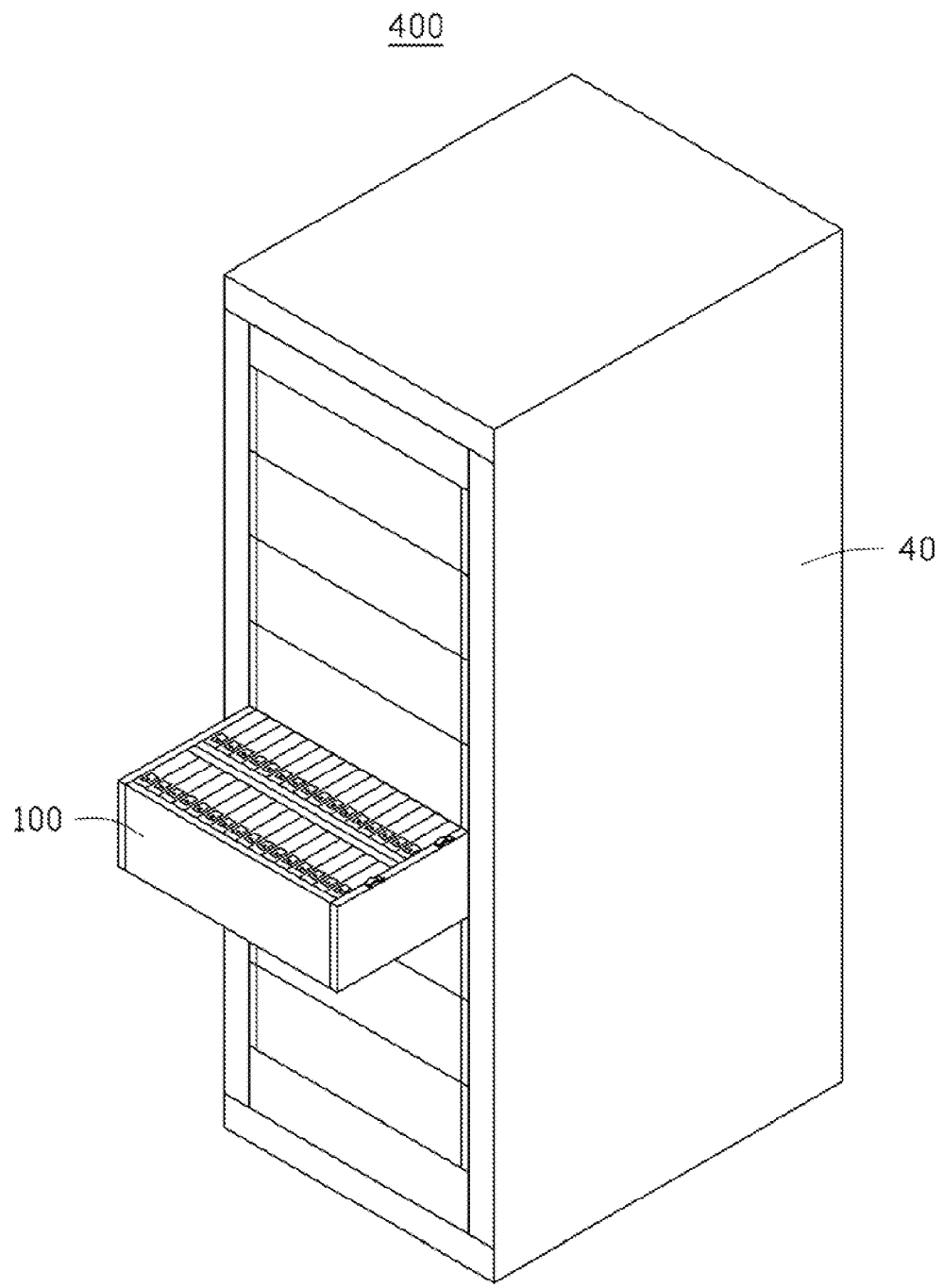
FIG. 1 is an isometric view of an embodiment of an electronic device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

A definition that applies throughout this disclosure will now be presented.

The term "comprising" means "including, but not necessarily limited to"; it specifically indicates open-ended inclusion or membership in a so-described combination, group, series and the like.

FIG. 1 illustrates an embodiment of an electronic device 400 of the present disclosure. The electronic device 400 can comprise a housing 40 and a plurality of storage devices 100 mounted in the housing 40 of the electronic device 400.

Figure 2:
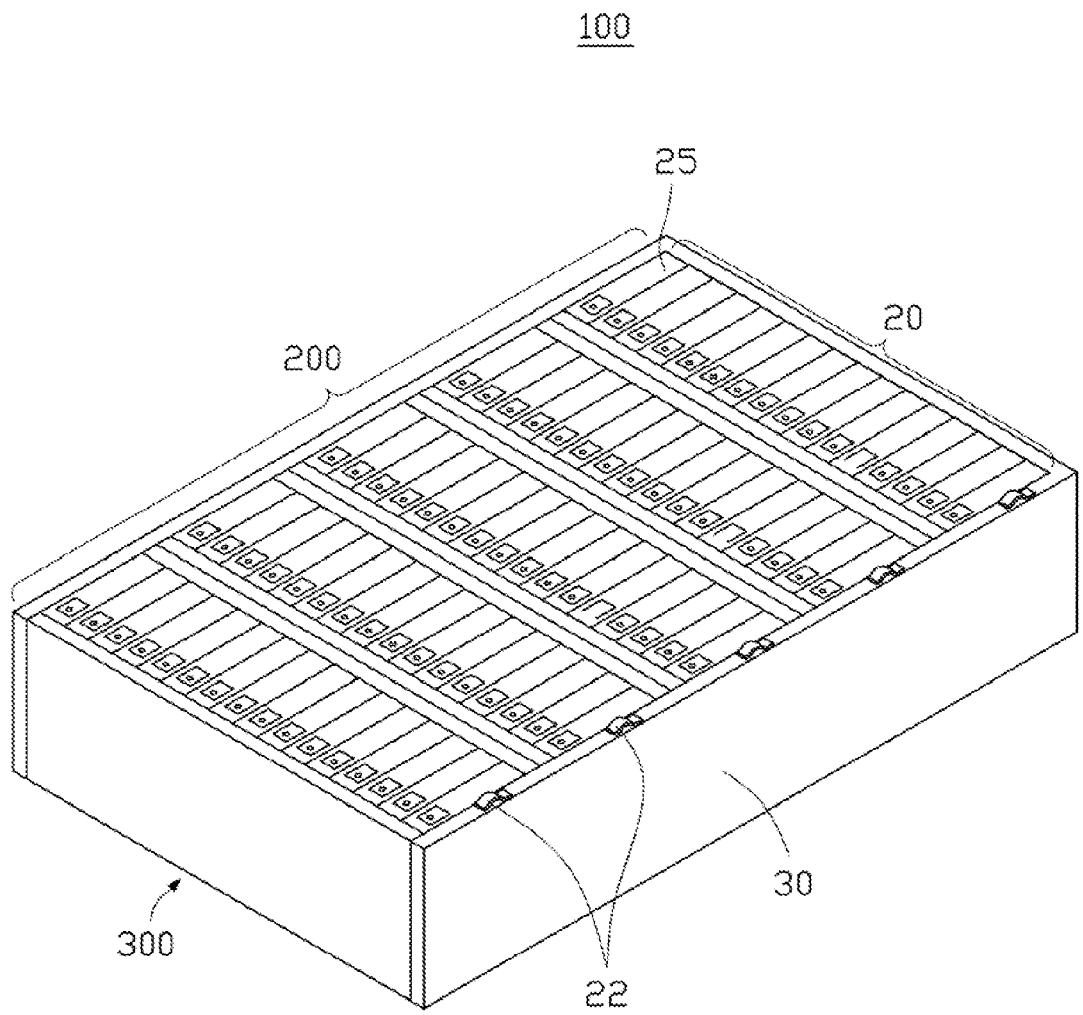
FIG. 2 is an isometric view of an embodiment of a storage device of FIG. 1, wherein the storage device comprises a hard disk drive (HDD) module.

FIG. 2 illustrates an isometric view of embodiment of the storage device 100. The storage device 100 can comprise a hard disk drive (HDD) module 200 and a chassis 300. The HDD module 200 is configured for mounting in the chassis 300. The HDD module 200 can comprise a plurality of HDD units 20. The chassis 300 comprises a side wall 30 and a plurality of switching units 22. Each of the HDD units 20 can comprises a plurality of HDDs 25 and a corresponding switching unit 22. Each of the switching units 22 is positioned on a top surface of the side wall 30, and is adjacent with one corresponding HDD unit 20.

Figure 3:
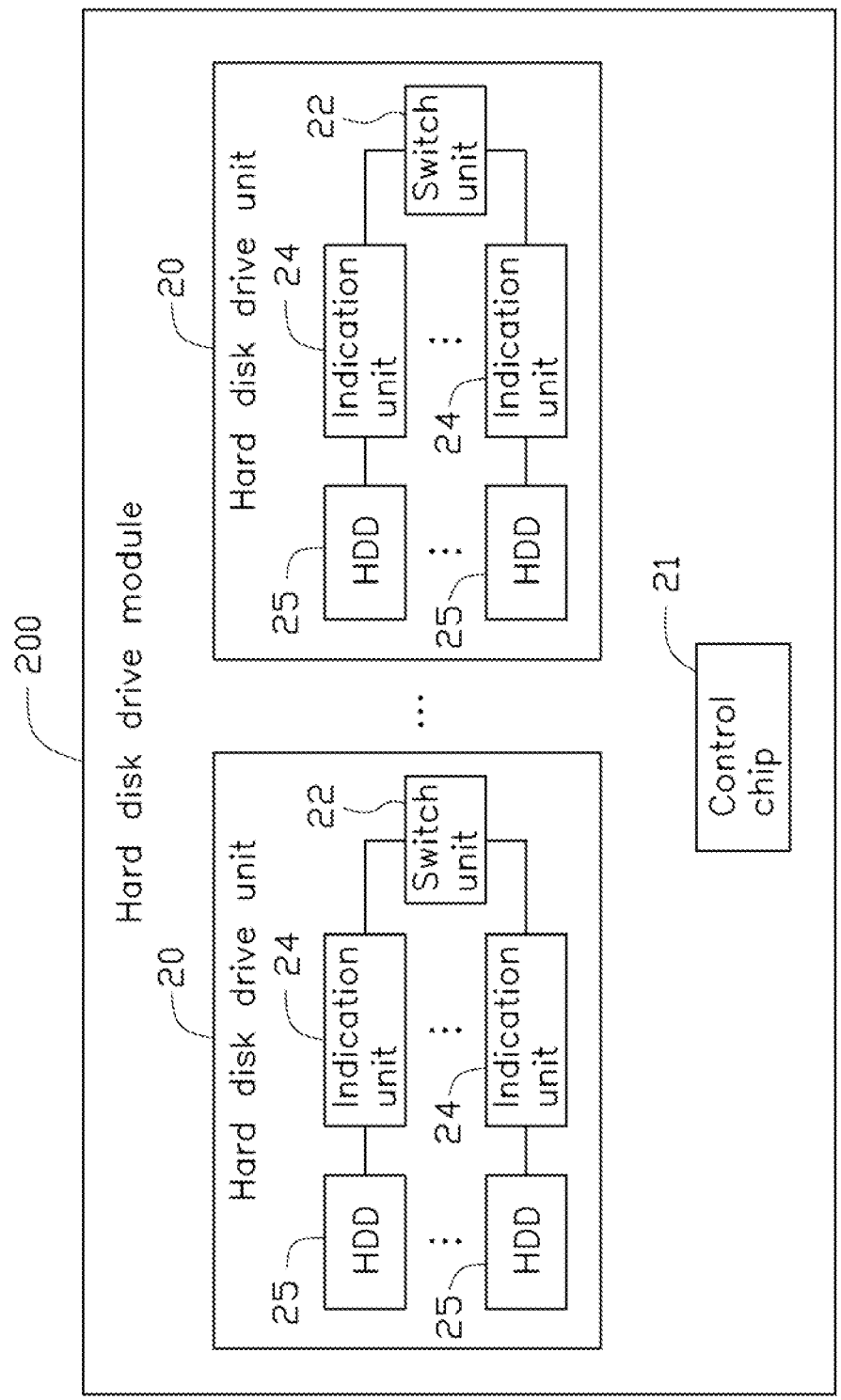
FIG. 3 is a block diagram of an example embodiment of the HDD module of the present disclosure shown in FIG. 2, wherein the HDD module comprises a plurality of HDD units and a control chip coupled to the HDD units.

FIG. 3 is a block diagram of an example embodiment of the HDD module 200. In the embodiment, the HDD module 200 further comprises a control chip 21 electrically coupled to the plurality of HDD units 20. Each of the HDD units 20 can also comprise a plurality of indication units 24. The indication units 24 are all electrically coupled to the switching unit 22. Each indication unit 24 is electrically coupled one HDD 25 of the HDD unit 20, and is configured to display the operation status of the each of the HDD 25.

Figure 4:
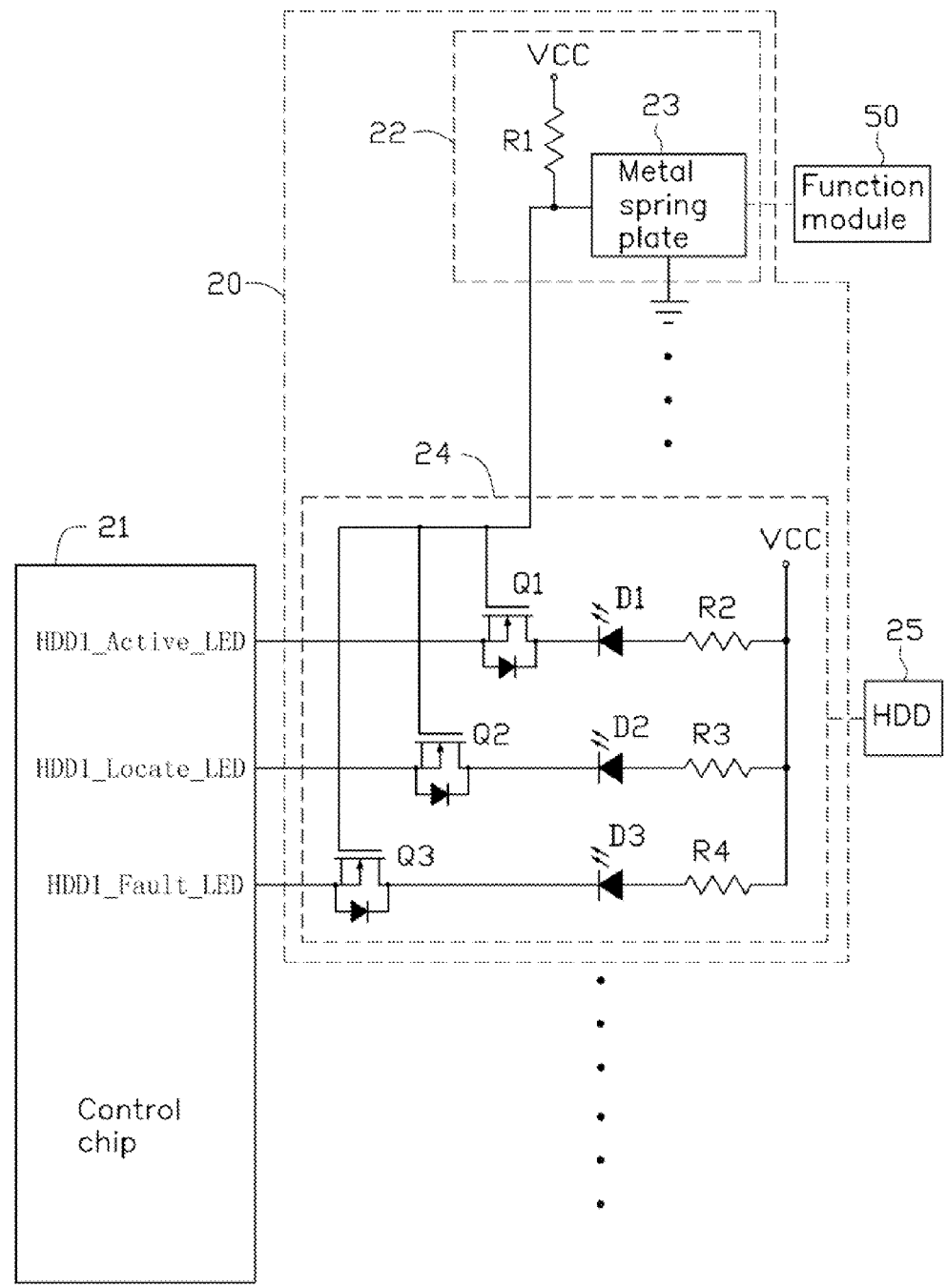
FIG. 4 is a circuit diagram of an example embodiment of one HDD unit coupled to the control chip of the present disclosure shown in FIG. 3.

FIG. 4 is a circuit diagram of an example embodiment of one HDD unit 20 coupled to the control chip 21. In at least one embodiment, the switching unit 22 can comprise a resistor R1 and a metal spring plate 23. The metal spring plate 23 can be a curved elastic structure. A first end of the metal spring plate 23 is electrically coupled to a power supply VCC through the resistor R1, when the metal spring plate 23 is pressed by a function module 50 positioned on the chassis 300. A second end of the metal spring plate 23 is electrically coupled to the ground. In at least one embodiment, the function module 50 can be another storage device, a server, a network device, or a top plate of the chassis 300.

In the embodiment, the indication unit 24 can comprise three light emitting diodes (LEDs) D1, D2, D3, three resistors R2, R3, R4, and three n-channel field effect transistors (FETs) Q1, Q2, Q3. A source of the FET Q1 is electrically coupled to a first signal pin HDD1_Active_LED of the control chip 21. A gate of the FET Q1 is electrically coupled to first end of the metal spring plate 23. A drain of the FET Q1 is electrically coupled to a cathode of the LED D1. An anode of the LED D1 is electrically coupled to the power supply VCC through the resistor R2. A source of the FET Q2 is electrically coupled to a second signal pin HDD1_Locate_LED of the control chip 21. A gate of the FET Q2 is electrically coupled to first end of the metal spring plate 23. A drain of the FET Q2 is electrically coupled to a cathode of the LED D2. An anode of the LED D2 is electrically coupled to the power supply VCC through the resistor R3. A source of the FET Q3 is electrically coupled to a third signal pin HDD1_Fault_LED of the control chip 21. A gate of the FET Q3 is electrically coupled to first end of the metal spring plate 23. A drain of the FET Q3 is electrically coupled to a cathode of the LED D3. An anode of the LED D3 is electrically coupled to the power supply VCC through the resistor R4. Each indication unit 24 is coupled to one HDDs 25.

When the chassis 300 is inserted into the housing 40 of the electronic device 400, each metal spring plate 23 is pressed by the function module 50. A second end of each metal spring plate 23 is electrically coupled to ground. Thus, each of the switching units 22 operates in a first state. The switching unit 22 outputs a first control signal at a low level, such as logic "0", to the indication unit 24 of the hard disk drive units 20, to enable the FETs Q1, Q2, Q3 of the indication unit 24 to turn off. Thus, the LEDs D1, D2, D3 of the indication unit 24 are turned off and extinguished.

When the chassis 300 is pulled out from the housing 40 of the electronic device 400, each metal spring plate 23 is not pressed by the function module 50. A second end of the each metal spring plate 23 is not electrically coupled to ground. Thus, each of the switching units 22 operates in a second state. The switching unit 22 outputs a second control signal at a high level, such as logic "1", to the indication unit 24 of the hard disk drive units 20, to enable the FETs Q1, Q2, Q3 of the indication unit 24 to turn on. Each indication unit 24 receives an indication signal from the control chip 21, to display the operation status of the hard disk drive 25. Thus, the LEDs D1, D2, D3 of the indication unit 24 are turned on and lit.

As detailed above, when the storage device 100 of the electronic device 400 is inserted into the housing 40, the LEDs D1, D2, D3 of the indication unit 24 of the storage device 100 are all turned off and extinguished. When the storage device 100 of the electronic device 400 is pulled out from the housing 40, the LEDs of the storage device 100 are all turned on and lit.

The embodiments shown and described above are only examples. Many details are often found in the art such as the other features of the electronic device. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. A storage device comprising:
a hard disk drive (HDD) module comprising a plurality of HDD units, each of the HDD units comprising:
a plurality of HDDs;
a switching unit configured to alternatively operate in a first state and a second state; and
a plurality of indication units coupled to the switching unit, each of the indication units configured to display an operation of the corresponding HDD,
wherein the switching unit is configured such that when operating in the first state, the switching unit outputs a first control signal to turn off the corresponding indication units;
wherein the switching unit is further configured such that when operating in the second state, the switching unit outputs a second control signal to turn on the corresponding indication units; and
wherein the switching unit comprises a first resistor and a metal spring plate, the metal spring plate is a curved elastic structure, the metal spring plate comprises a first end and a second end, the first end of the metal spring plate is electrically coupled to a first power supply through the first resistor, when the metal spring plate is pressed, the switching unit operates in the first state, the second end of the metal spring plate is electrically coupled to a ground.

2. The storage device of claim 1, wherein when the metal spring plate is not pressed, the switching unit operates in the second state.

3. The storage device of claim 2, wherein the HDD module comprises a control chip, the control chip configured for detecting the operation state of the HDD, and outputting an indication signal to the corresponding indication unit, each the indication unit outputs a indication information according the indication signal, the indication unit comprises first to third field effect transistors (FETs), and first to third light emitting diodes (LEDs), a source of the first FET is electrically coupled to a first signal pin of the control chip, a gate of the first FET is electrically coupled to first end of the metal spring plate, a drain of the first FET is electrically coupled to a cathode of the first LED, an anode of the first LED is electrically coupled to the power supply through a second resistor, a source of the second FET is electrically coupled to a second signal pin of the control chip, a gate of the second FET is electrically coupled to first end of the metal spring plate, a drain of the second FET is electrically coupled to a cathode of the second LED, an anode of the second LED is electrically coupled to the power supply through a third resistor, a source of the third FET is electrically coupled to a third signal pin of the control chip, a gate of the third FET is electrically coupled to first end of the metal spring plate, a drain of the third FET is electrically coupled to a cathode of the third LED, an anode of the third LED is electrically coupled to the power supply through a fourth resistor.

4. A electronic device comprising:
a chassis comprises a side wall;
a hard disk drive module (HDD) configured for mounting in the chassis, the HDD module comprising a plurality of HDD units, each of the HDDs units comprising:
a plurality of HDDs;
a switching unit configured to alternatively operate in a first state and a second state; and
a plurality of indication units coupled to the switching unit, each of the indication units configured to display an operation of the corresponding HDD;
wherein the switching unit is configured such that when operating in the first state, the switching unit outputs a first control signal to turn off the corresponding indication units;
wherein the switching unit is further configured such that when operating in the second state, the switching unit outputs a second control signal to turn on the corresponding indication units;
wherein each of the switching units is positioned on a top surface of the side wall, and is adjacent with one corresponding HDD unit; and
wherein the switching unit comprises a first resistor and a metal spring plate, the metal spring plate is a curved elastic structure, the metal spring plate comprises a first end and a second end, the first end of the metal spring plate is electrically coupled to a first power supply through the first resistor, when the metal spring plate is pressed, the switching unit operates in the first state, the second end of the metal spring plate is electrically coupled to a ground.

5. The electronic device of claim 4, wherein when the metal spring plate is not pressed, the switching unit operates in the second state.

6. The electronic device of claim 5, wherein the HDD module comprises a control chip, the control chip configured for detecting the operation state of the HDD, and outputting an indication signal to the corresponding indication unit, each the indication unit outputs a indicating information according the indication signal, the indication unit comprises first to third field effect transistors (FETs), and first to third light emitting diodes (LEDs), a source of the first FET is electrically coupled to a first signal pin of the control chip, a gate of the first FET is electrically coupled to first end of the metal spring plate, a drain of the first FET is electrically coupled to a cathode of the first LED, an anode of the first LED is electrically coupled to the power supply through a second resistor, a source of the second FET is electrically coupled to a second signal pin of the control chip, a gate of the second FET is electrically coupled to first end of the metal spring plate, a drain of the second FET is electrically coupled to a cathode of the second LED, an anode of the second LED is electrically coupled to the power supply through a third resistor, a source of the third FET is electrically coupled to a third signal pin of the control chip, a gate of the third FET is electrically coupled to first end of the metal spring plate, a drain of the third FET is electrically coupled to a cathode of the third LED, an anode of the third LED is electrically coupled to the power supply through a fourth resistor.

* * * * *